US012584490B2

(12) United States Patent
Murad-Bickard

(10) Patent No.: US 12,584,490 B2
(45) Date of Patent: Mar. 24, 2026

(54) MONOLITHIC SHAFT FOR CRYOGENIC TURBO MACHINE, CRYOGENIC TURBO MACHINE AND METHOD FOR MANUFACTURING

(71) Applicant: CRYOSTAR SAS, Hesingue (FR)

(72) Inventor: Anny Murad-Bickard, Hesingue (FR)

(73) Assignee: Cryostar SAS, Hesingue (FR)

( * ) Notice: Subject to any disclaimer, the term of this patent is extended or adjusted under 35 U.S.C. 154(b) by 0 days.

(21) Appl. No.: 18/695,520

(22) PCT Filed: Sep. 28, 2022

(86) PCT No.: PCT/EP2022/025448

§ 371 (c)(1),
(2) Date: Mar. 26, 2024

(87) PCT Pub. No.: WO2023/051952

PCT Pub. Date: Apr. 6, 2023

(65) Prior Publication Data

US 2024/0392797 A1 Nov. 28, 2024

(30) Foreign Application Priority Data

Oct. 1, 2021 (EP) .................................... 21315195

(51) Int. Cl.
*F04D 29/053* (2006.01)
*F04D 7/02* (2006.01)
(Continued)

(52) U.S. Cl.
CPC ............. *F04D 29/053* (2013.01); *F04D 7/02* (2013.01); *F04D 25/04* (2013.01); *F04D 25/06* (2013.01);
(Continued)

(58) Field of Classification Search
CPC .......... F04D 7/02; F04D 29/053; F04D 25/04; F04D 25/06; F04D 29/023; F04D 29/058
See application file for complete search history.

(56) References Cited

U.S. PATENT DOCUMENTS 5,431,752 A * 7/1995 Brogle ................. B23K 20/129 148/516
9,926,976 B2 * 3/2018 Masala ................... F16C 43/00
(Continued)

FOREIGN PATENT DOCUMENTS

DE 102012217560 A1 * 4/2014 ............. F16D 1/068
DE 10 2019 215444 A1 4/2021
(Continued)

OTHER PUBLICATIONS

English translation of JP H03-81507 (Year: 1991).*

*Primary Examiner* — Topaz L. Elliott
(74) *Attorney, Agent, or Firm* — Millen, White, Zelano & Branigan, P.C.; Brion P. Heaney

(57) ABSTRACT

A monolithic shaft configured for use in a cryogenic turbo machine with an impeller to be mounted at the monolithic shaft, the monolithic shaft comprising an impeller part, at which said impeller is to be mounted, and a support part, wherein the monolithic shaft comprises or is made of a first material and a second material, wherein said first material and said second material differ from each other in ferromagnetic and/or cryogenic properties, wherein said impeller part comprises or is made of said first material, and said support part comprises or is made of said second material. The invention also relates to such cryogenic turbo machine and a method of manufacturing such monolithic shaft.

17 Claims, 5 Drawing Sheets

(51) Int. Cl.

| | |
|---|---|
| ***F04D 25/04*** | (2006.01) |
| ***F04D 25/06*** | (2006.01) |
| ***F04D 29/02*** | (2006.01) |
| ***F04D 29/058*** | (2006.01) |

(52) U.S. Cl.
CPC ......... *F04D 29/023* (2013.01); *F04D 29/058* (2013.01); *F05D 2230/31* (2013.01); *F05D 2300/507* (2013.01)

(56) References Cited

U.S. PATENT DOCUMENTS

| | | | | |
|---|---|---|---|---|
| 2007/0113552 | A1* | 5/2007 | Fremerey | F01D 25/243 60/605.1 |
| 2008/0163622 | A1* | 7/2008 | Schlegl | F01D 25/16 60/599 |
| 2015/0275965 | A1* | 10/2015 | Masala | F16C 32/0468 310/90.5 |
| 2016/0297024 | A1* | 10/2016 | Tan | B23K 9/048 |
| 2020/0400155 | A1 | 12/2020 | Sun et al. | |
| 2024/0297551 | A1* | 9/2024 | Blaser | H02K 1/27 |
| 2024/0356408 | A1* | 10/2024 | Blaser | H02K 1/02 |

FOREIGN PATENT DOCUMENTS

| | | | | | |
|---|---|---|---|---|---|
| DE | 20 2021 101195 | U1 | | 5/2021 | |
| JP | H03 81507 | A | | 4/1991 | |
| JP | 2006170046 | A | * | 6/2006 | |
| JP | 2011208518 | A | * | 10/2011 | F04D 29/624 |
| KR | 102004201 | B1 | * | 7/2019 | F04D 29/05 |

* cited by examiner

MONOLITHIC SHAFT FOR CRYOGENIC TURBO MACHINE, CRYOGENIC TURBO MACHINE AND METHOD FOR MANUFACTURING

The present invention relates to a monolithic shaft configured for use in a cryogenic turbo machine with an impeller to be mounted at the monolithic shaft, to such a cryogenic turbo machine and to a method of manufacturing such monolithic shaft.

BACKGROUND

In cryogenic applications, i.e. applications with process gases at cryogenic temperatures, e.g., plants for air separation or the like, cryogenic turbo machines like turbo compressors are often used. Such turbo compressors typically comprise an expander impeller and a compressor impeller, which are fixed on both ends of a shaft. Such shaft has to sustain a high torques created by gas flowing through the impellers. In particular, in cryogenic applications, gas or process gas, flowing through the impellers may reach temperatures down to 20K at the expander outlet or at the compressor inlet.

Rotation of the shaft can be guided by magnetic bearings; also, an electric machine can be installed on or using such shaft. Both applications typically require good ferromagnetic properties of the shaft. Thus, such shaft has to combine, on the one hand, a high impact toughness at one or both of its ends and at the coldest temperature it experience, and, on the other hand, a high magnetic induction to sustain high axial thrusts.

It is therefore an object of the present invention to provide an improved shaft for a cryogenic turbo machines with magnetic applications.

DISCLOSURE OF THE INVENTION

This object is achieved by providing a monolithic shaft for a cryogenic turbo machine, to a cryogenic turbo machine and to a method of manufacturing such a monolithic shaft with the features of the independent claims. Embodiments of the invention are the subject of the dependent claims and of the description that follows.

The invention relates to cryogenic turbo machines like turbo compressors or turbo expanders with an impeller and, in particular, to monolithic shafts used in such turbo machines. Such turbo machines can also combine a compressor and an expander; then two impellers, an expander impeller and a compressor impeller, which are, typically, fixed on both ends of the monolithic shaft, are used. Cryogenic turbo machines are used with gases or process gases at cryogenic temperatures, i.e., very low temperatures of, e.g., less than 77K, even down to 20K, e.g., at the expander outlet or at the compressor inlet. Depending on the kind of turbo machine, such gases are compressed and/or expanded. Such monolithic shaft has to sustain a high torques created by gas flowing through the impellers. This holds in particular true for turbo machines with two impellers.

Rotation of the monolithic shaft can be guided by magnetic bearings, which typically comprise (a pair of) radial bearings, (a pair of) auxiliary bearings and axial bearings. The axial bearings typically interact with an axial thrust disk, which is part of the monolithic shaft; thus, this monolithic shaft has to be ferromagnetic. Further, a (high-speed) electric machine like a motor and/or generator can be installed on or using such monolithic shaft, typically the center part of the monolithic shaft; this typically requires a high level of ferromagnetism for the monolithic shaft. Such electric machine can be used in conjunction to magnetic bearings or also with oil bearings (instead of magnetic bearings). When used at cryogenic temperatures, a temperature gradient occurs along the monolithic shaft axis. The experienced temperatures typically depend on the limit conditions of the rotor of the electric machine.

Thus, the monolithic shaft has to combine, on the one hand, a high impact toughness at one or both of its ends and at the coldest temperature it experiences, and, on the other hand, a high magnetic induction to sustain high axial thrusts.

Providing such monolithic shaft is, so far, not possible because highly ferromagnetic steels, for example, are unsuitable for very cold, cryogenic temperatures whereas cryogenic steels, for example, exhibit a poor ferromagnetism. They, typically, rank in the magnetically soft materials. Alloy typically used for shafts down to 77K and less is often optimized for impact toughness and is poorly ferromagnetic because ferromagnetism and impact toughness are negatively correlated to each other. Thus, the axial thrust of extremely cold expanders and/or compressors has to be limited, what does not allow working at the maximum efficiency the turbo machine could supply. Conversely, if a high axial thrust has to be sustained, the process gas minimum temperature is limited because of the use of magnetically hard materials; this restrains the use of such turbo machines to mild cold applications.

In view of this background, a monolithic shaft configured for use in a cryogenic turbo machine with an impeller to be mounted at the monolithic shaft is provided.

In the context of the invention, the term monolithic shaft means that despite the fact that the shaft has two or more different areas made of different materials, It is not possible to disassemble the different areas.

The advantage of a monolithic shaft of different materials construction is that the mechanic design which was initially done for a single material shaft is still totally applicable to the new bimaterial shaft. The bimaterial monolithic shaft can withstand the same stresses than the single material shaft and the rotordynamic behavior is similar since physical properties for the two materials are closed to each other.

There is no discontinuity between the two materials and the properties evolve continuously from one material to the other.

This is of particular interest when the shaft experiences temperature gradient along its long axis because the transition area can smoothly accommodate the differences of dilatation coefficients The monolithic construction also avoid the use of screws and fasteners which can get loose during operation or be submitted to assembly mistakes like uncorrect tightening torque applicable. Therefore the monolithic construction is much more reliable and easy to assemble in the machine.

The monolithic shaft comprises an impeller part and a support part; at said impeller part, said impeller is to be mounted. Said support part can be used for support by means of bearings, for example, or for used as or with at least port of a rotor of an electric machine. In addition, the monolithic shaft may also comprise a further impeller part for a further impeller of the turbo machine, e.g., if the turbo machine has an expander impeller and a compressor impeller.

The monolithic shaft comprises or is made of two different materials, a first material and a second material, wherein said first material and said second material differ from each other in ferromagnetic and/or cryogenic properties. In particular, said second material has a higher magnetic induction than said first material. In addition or alternatively, said second material preferably has a higher magnetic permeability than said first material. Said first material, in turn, can have better cryogenic properties, in particular higher impact toughness, in particular at a pre-determined (or design) temperature, than said second material. Particularly, said first material comprises or is steel, or comprises or is a steel alloy or is a nickel based alloy. Also, said second material preferably comprises or is steel, or comprises or is a steel alloy.

Magnetic induction (or electromagnetic induction) is the production of an electromotive force across an electrical conductor in a changing magnetic field. Consequently, a material providing (or generating) higher magnetic induction than another material, at the same remaining constraints, has better ferromagnetic properties. Such material provides higher magnetic flux. Typically, a material providing high(er) magnetic induction also has high(er) magnetic permeability.

Impact toughness (which is one of the material fracture properties)) is the ability for or of a material to absorb energy during a severe shock in presence of a stress concentration; impact toughness is a dynamic property, not a quasi-static property. In particular, it describes the material behavior under the worst loading conditions (the most harmful ones). While all kinds of toughnesses are dependant on the temperature, the impact toughness defines a so-called "ductile-to-brittle transition temperature" (DBTT). To be suitable for cryogenic use or service, a material must not have a DBTT lower than the design temperature.

Said impeller part comprises or is made of said first material, and said support part comprises or is made of said second material. Note that there might be a further support part made of other material than the second material, e.g., the first material; such further support part can be used, e.g., if not all (magnetic) bearings should or must be opposed to highly ferromagnetic material.

Such monolithic shaft allows combining a high impact toughness and a high ferromagnetism in one monolithic shaft for a cryogenic turbo machine. It has turned out that a preferred material as said second material (magnetic steel) is either a low alloy steel (LAS) whose main alloying elements are chromium, nickel and molybdenum or a carbon steel (CS), depending on the selected assembly or manufacturing method, which will be described later. A preferred material as said first material (cryogenic steel) is a precipitation hardening stainless steel (PHSS). Said precipitation hardening stainless steel is, preferably, quenched and/or double tempered. This allows achieving best impact toughness properties. Alternatively, the first material can also be a a nickel based alloy (NBA)

The invention also relates to a cryogenic turbo machine comprising an impeller and a monolithic shaft as described above. Said impeller is mounted at said impeller part of the monolithic shaft, in particular at an end of the monolithic shaft. As mentioned above, such cryogenic turbo machine can also comprise a further impeller, which is then mounted at a further impeller part of the monolithic shaft, which also comprises or is made of said first material. In case of two impellers, the impeller parts can be positioned at the ends of the monolithic shaft, while the support part is positioned in the center area, in particular between the two impeller parts.

In addition, said cryogenic turbo machine can further comprise magnetic bearings, by which the monolithic shaft, in particular at said support part, is supported in axial and/or radial direction. Preferably, said cryogenic turbo machine further comprises an electric machine, said electric machine comprising the monolithic shaft, and in particular said support part, as at least part of a rotor. It is noted that a cryogenic turbo machine having said electric machine can have oil bearings (radial and/or axial direction); it can also have, however, magnetic bearings.

The invention also relates to a method for manufacturing such monolithic shaft as described above. Said method comprises providing an individual component comprising one of the impeller part and the support part, i.e. either the impeller part or the support part. Then, the other one of the monolithic shaft part and the support part, i.e., the one that is not provided in the prior step as the individual component, is added to said individual component to form the monolithic shaft. In particular, two different ways of specific manufacturing or adding the second part to the infidel component provided in the first step are preferred.

A first way is providing a further individual component, said further individual component comprising the other one of the monolithic shaft part and the support part, i.e., the one that is not provided in the prior step as the individual component. Then, the individual components are combined or assembled by means of friction welding, in particular, rotative friction welding. This allows providing a monolithic part as the monolithic shaft, comprising or consisting of two standardized materials and a metallic interface (the zone, in which the two materials are somewhat combined due the welding or melting) between them.

This method or technology, typically, requires the use of two wrought materials, the more magnetic of the two consisting of LAS exhibiting good impact properties at least down to −60° C. (213K). Such construction has been qualified by destructive tests consisting of tensile tests, hardness tests, Charpy-V impacts tests and magnetic tests. The interface between the PHSS or NBA and the LAS is, preferably, located under said auxiliary bearings, whose minimum temperature typically is −40° C. (233K). Therefore, the interface properties may exhibit slightly less impact toughness than the base LAS.

Another way is adding the other one of the monolithic shaft part and the support part, i.e., the one that is not provided in the prior step as the individual component, at the individual component by means of additive manufacturing. The additive manufacturing is, in particular, based on one of the following techniques: wire arc additive manufacturing (WAAM), wire laser additive manufacturing (WLAM), direct energy deposition (DED), and cold spraying. This also allows providing a monolithic part as the monolithic shaft, comprising or consisting of two standardized materials.

With such additive technologies or methods, two different procedures can be applied. A first procedure is the construction of PHSS monolithic shaft ends (impeller sides) on a LAS center part (support part). The constraints in that case are the same as those for friction welding. Another procedure is additive manufacturing of a central axial thrust disc (support part) for magnetic bearings on a PHSS cylinder or NBA (kind of pre-stage monolithic shaft comprising the impeller parts). The interface in that case is located at the bottom of the disc in an area where the temperature is, typically, always positive (in ° C.). This allows a wider choice for the magnetic steel grade, with the possibility to use a CS for said first material as well. However, this is technology is typically restricted to magnetic bearing machines without a high-speed motor or generator.

The advantages of the present invention are, in particular, the possibility to operate with a process gas in deep cryogenic conditions down to 20K and take advantage of the high ferromagnetism of the monolithic shaft center part.

This allows the possibility to compensate high axial thrusts with magnetic bearings and/or to add a high-speed electric machine to the turbo machine. In particular, the provided methods allow combining the two different materials into a final monolithic monolithic shaft.

With respect to further embodiments and advantaged of the monitoring system and the process plant, it is referred to the remarks with respect to the method, which apply correspondingly.

SHORT DESCRIPTION OF THE FIGURES

DETAILED DESCRIPTION OF THE FIGURES

Figure 1:
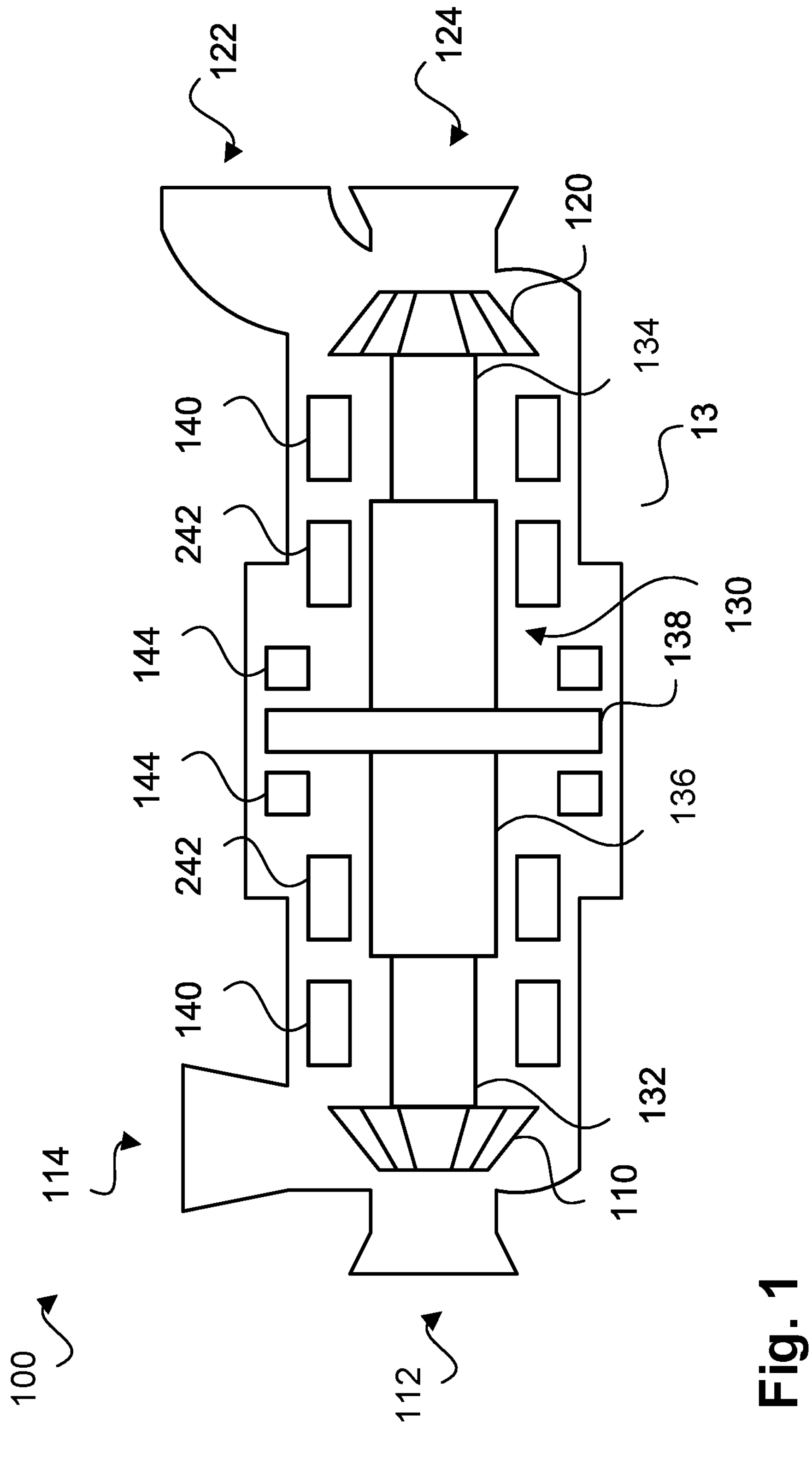
FIG. 1 illustrates a cryogenic turbo machine according to a preferred embodiment of the invention.

FIG. 1 schematically illustrates a cryogenic turbo machine 100 according to a preferred embodiment of the invention. The cryogenic turbo machine 100 comprises, by means of example, two impellers, a first impeller 110 and a second impeller 120, both mounted on a monolithic shaft 130. The turbo machine comprises openings 112 and 114 on the side of the first impeller 110, the openings used as inlet and outlet for air to be compressed. The turbo machine further comprises openings 122 and 124 on the side of the second impeller 120, the openings used as inlet and outlet for air to be expanded. Thus, the first impeller 110 is a compressor impeller and the second impeller 120 is an expander impeller.

Further, the turbo machine comprises different kind of bearings used for supporting and guiding the monolithic shaft 130. Said bearings comprise (a pair of) auxiliary bearings 140 at both ends with respect to the monolithic shaft 130, (a pair of) radial magnetic bearings 142 for supporting and guiding the monolithic shaft 130 in radial direction, and axial magnetic bearings 144 for supporting and guiding the monolithic shaft 130 in axial direction. Auxiliary bearings, which are also called landing bearings, typically support the monolithic shaft when the machine stops and the magnetic flux is shut-off in the radial bearings.

The monolithic shaft 130 comprises different parts or sections. At each of both ends, the monolithic shaft 130 comprises an impeller part 132 and 134, respectively. In the center area, the monolithic shaft comprises a support part 136. At the impeller parts 132, 134, the impellers 110, 120 are to be mounted, one impeller at each end. There are different possible ways that can be used to provide connections between the monolithic shaft and the impeller. One way is a so-called polygon connection. In that case, the impeller is shrink-fitted on the monolithic shaft and secured by an axial screw. The screw used for such polygon connection is, preferably, pre-stressed and the pre-stress can be calculated in the same manner as for a so-called Hirth teeth connection. Another way is the so-called Hirth teeth connection. In that case, the impeller is axially pressed on the monolithic shaft end by a pre-stress stud whose load is calculated as a function of the monolithic shaft torque and the stud elastic properties. The support part 136 is used for supporting the monolithic shaft by means of the magnetic bearings. In order to provide the axial support using the axial magnetic bearings 144, the center part 136 comprises a disk shaped part 138, a so-called axial thrust disk, which is opposed to the axial magnetic bearings 144 in axial direction.

As mentioned above, the center part 136 magnetically interacting with the magnetic bearings should be ferromagnetic, in particular, should have high magnetic induction. The impeller parts 132, 134 (the ends) of the monolithic shaft, however, should resist low temperatures, e.g., down to 20K. Thus, the monolithic shaft has to combine, on the one hand, a high impact toughness at one or (in the example) both of its ends and at the coldest temperature it experiences, and, on the other hand, a high magnetic induction to sustain high axial thrusts. This can be achieved, within the present invention, by using two different materials for the monolithic shaft as will be shown and explained in more detail with respect to the following FIGS.

Figure 2:
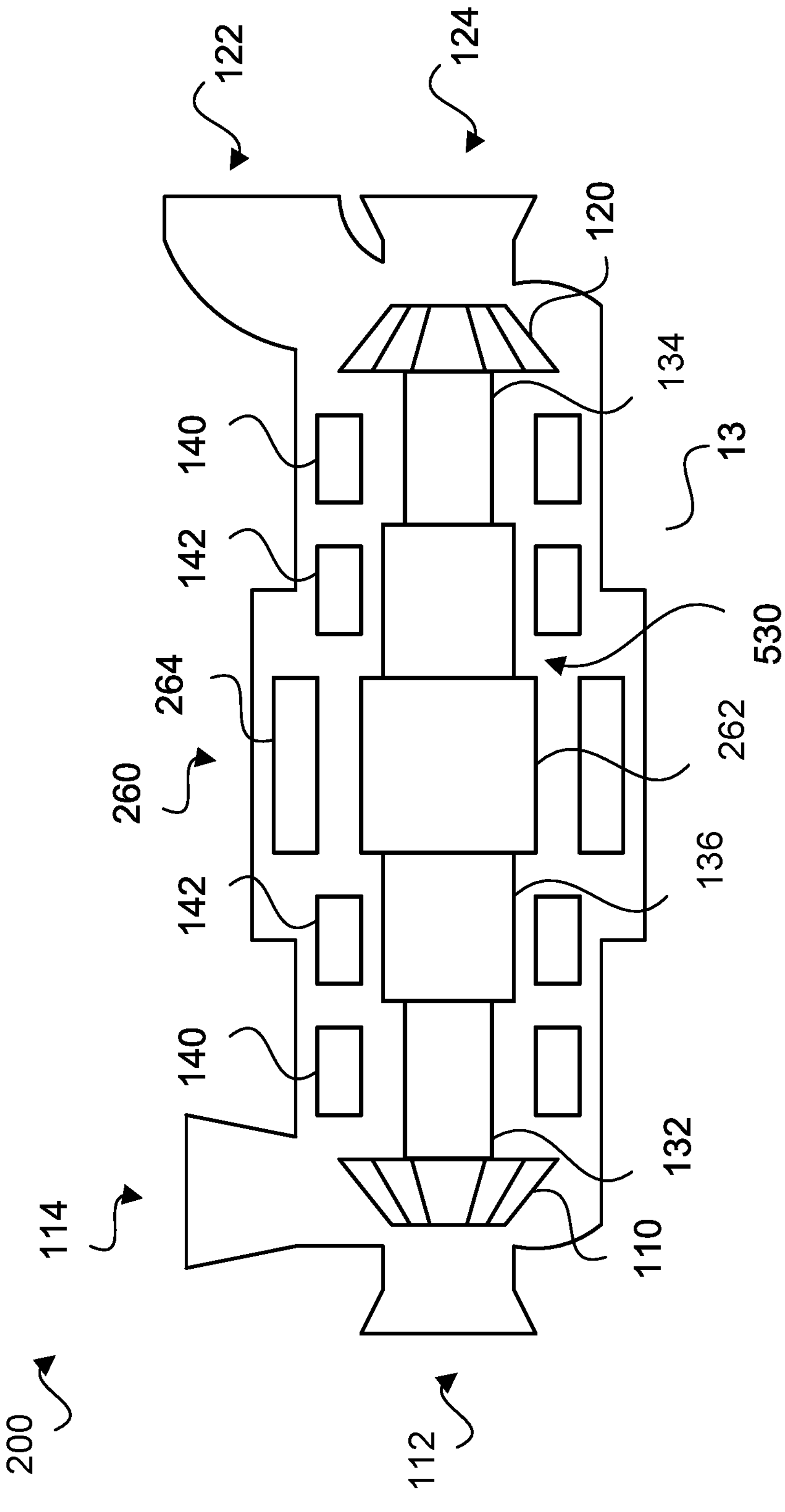
FIG. 2 illustrates a cryogenic turbo machine according to a further preferred embodiment of the invention.

FIG. 2 schematically illustrates a cryogenic turbo machine 200 according to a further preferred embodiment of the invention. The cryogenic turbo machine 200 is, basically, similar to cryogenic turbo machine 100; thus, reference is made to the above description of FIG. 1, which applies also to FIG. 2 (using the same reference numerals for the same components/parts).

A difference is, however, that cryogenic turbo machine 200 comprises an electric machine 260 (e.g., a motor and/or generator), said electric machine having a rotor 262 and a stator 264. The rotor, in particular, is part of the monolithic shaft 230. Contrary to monolithic shaft 130 of FIG. 1, monolithic shaft 230 does not have—in the shown example—the disk shaped part in the support part 136; instead, the monolithic shaft comprises said rotor 262 or is used as part of the rotor. The monolithic shaft, typically, is also fitted with some shrink-fitted sleeves, rings and metal sheets in case of magnetic bearings. Laminations can provide the required magnetism for radial bearings.

In addition, the radial bearings 142 can be oil bearings instead of magnetic bearings as shown in FIG. 1. Nevertheless, also radial magnetic bearings can be used. If the radial bearings are magnetic bearings, the axial bearings typically are magnetic as well. If the radial bearings are oil bearings, the axial bearings typically are oil bearings as well.

As mentioned above, the center part 136 of the monolithic shaft has to be ferromagnetic; it requires a high level of ferromagnetism. Similar to the situation of FIG. 1, the monolithic shaft has to combine, on the one hand, a high impact toughness at one or both of its ends and at the coldest temperature it experiences, and, on the other hand, a high magnetic induction. This can be achieved, within the present invention, by using two different materials for the monolithic shaft as will be shown and explained in more detail with respect to the following FIGS.

Figure 3:
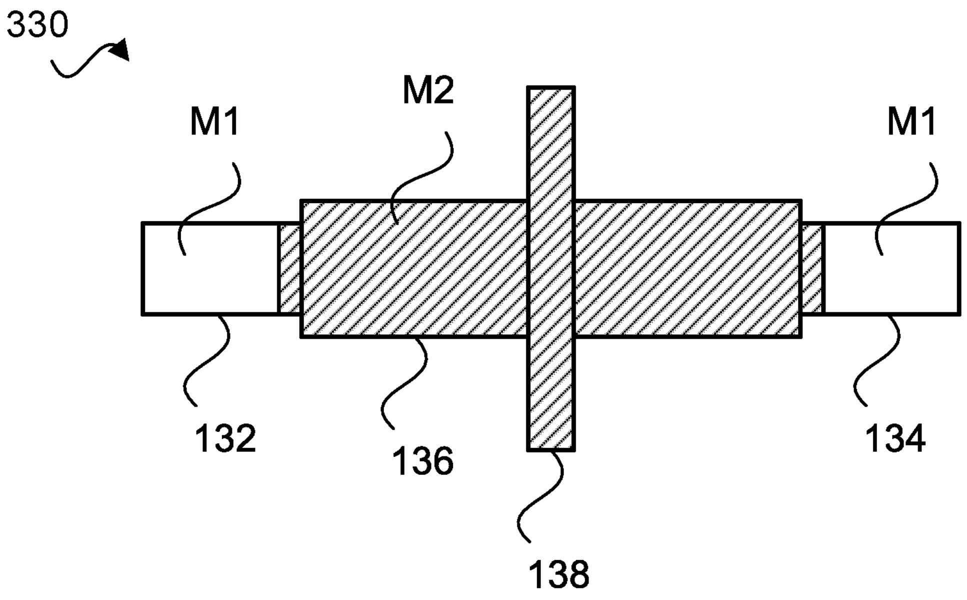
FIG. 3 illustrates a monolithic shaft for use in a cryogenic turbo machine according to a preferred embodiment of the invention.

FIG. 3 illustrates a monolithic shaft 330 for use in a cryogenic turbo machine, e.g., cryogenic turbo machine 100 of FIG. 1, according to a preferred embodiment of the invention. Similar to FIG. 1, two impeller parts 132, 134 at the ends of monolithic shaft 330, and a support part 136 comprising a disk shaped part 138, are shown. The monolithic shaft is made of two different materials, a first material M1 and a second material M2 (illustrated by means of shading). Said impeller parts 132, 134 comprise or are made of said first material M1, and said support part 136 (including the disk shaped part 138) comprises or is made of said second material M2.

Said first material M1 is, for example, precipitation hardening stainless steel (PHSS), which is quenched and double tempered or nickel based alloy. Such cryogenic steel achieves very good impact toughness properties. Said second material M2 is, for example, low alloy steel (LAS), whose main alloying elements are chromium, nickel and molybdenum. LAS has good impact properties, typically, at least down to −60° C. Such magnetic steel has very good ferromagnetic properties. Alternately, said second material M2 can be carbon steel (CS), which also has very good ferromagnetic properties.

Said monolithic shaft 330 is, preferably, made by rotative friction welding. This technology requires the use of two wrought materials, i.e., said first and said second materials and the respective parts of the monolithic shaft (two impeller parts and support part) being wrought parts. This also means that the impeller parts and the support part are provided as individual components, which are then combined or attached to each other. The interfaces between the two materials can or will be located under or near the auxiliary bearings 140 (see FIG. 1), whose minimum temperature is, typically, −40° C. Therefore, the interface properties may exhibit slightly less impact toughness than the base LAS.

Figure 4:
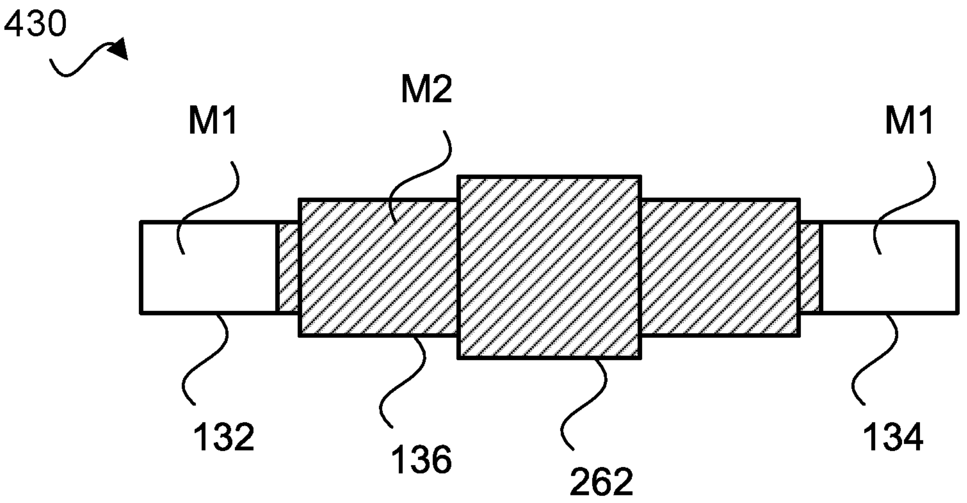
FIG. 4 illustrates a monolithic shaft for use in a cryogenic turbo machine according to a further preferred embodiment of the invention.

FIG. 4 illustrates a monolithic shaft 430 for use in a cryogenic turbo machine, e.g., cryogenic turbo machine 200 of FIG. 2, according to a further preferred embodiment of the invention. Similar to FIG. 3, two impeller parts 132, 134 at the ends of monolithic shaft 430, and a support part 136 are shown. The support part 136 comprises the rotor 262 or part of a rotor. Like monolithic shaft 330, monolithic shaft 430 is made of two different materials, said first material M1 and said second material M2 (illustrated by means of shading). Said impeller parts 132, 134 comprise or are made of said first material M1, and said support part 136 (including the rotor 262) comprises or is made of said second material M2.

Like for monolithic shaft 330, said first material M1 is, for example, precipitation hardening stainless steel (PHSS) which is also quenched and double tempered or nickel based alloy (NBA). Such cryogenic steel achieves very good impact toughness properties. Said second material M2 is, for example, low alloy steel (LAS), whose main alloying elements are chromium, nickel and molybdenum. LAS has good impact properties, typically, at least down to −60° C. Such magnetic steel has very good ferromagnetic properties. Alternately, said second material M2 can be carbon steel (CS), which also has very good ferromagnetic properties.

Said monolithic shaft 430 is, preferably, made by rotative friction welding. This technology requires the use of two wrought materials, i.e., said first and said second materials and the respective parts of the monolithic shaft (two impeller parts and support part) being wrought parts. This also means that the impeller parts and the support part are provided as individual components, which are then combined or attached to each other. The interfaces between the two materials can or will be located under or near the auxiliary bearings 140 (see FIG. 2), whose minimum temperature is, typically, −40° C. Therefore, the interface properties may exhibit slightly less impact toughness than the base LAS.

Figure 5:
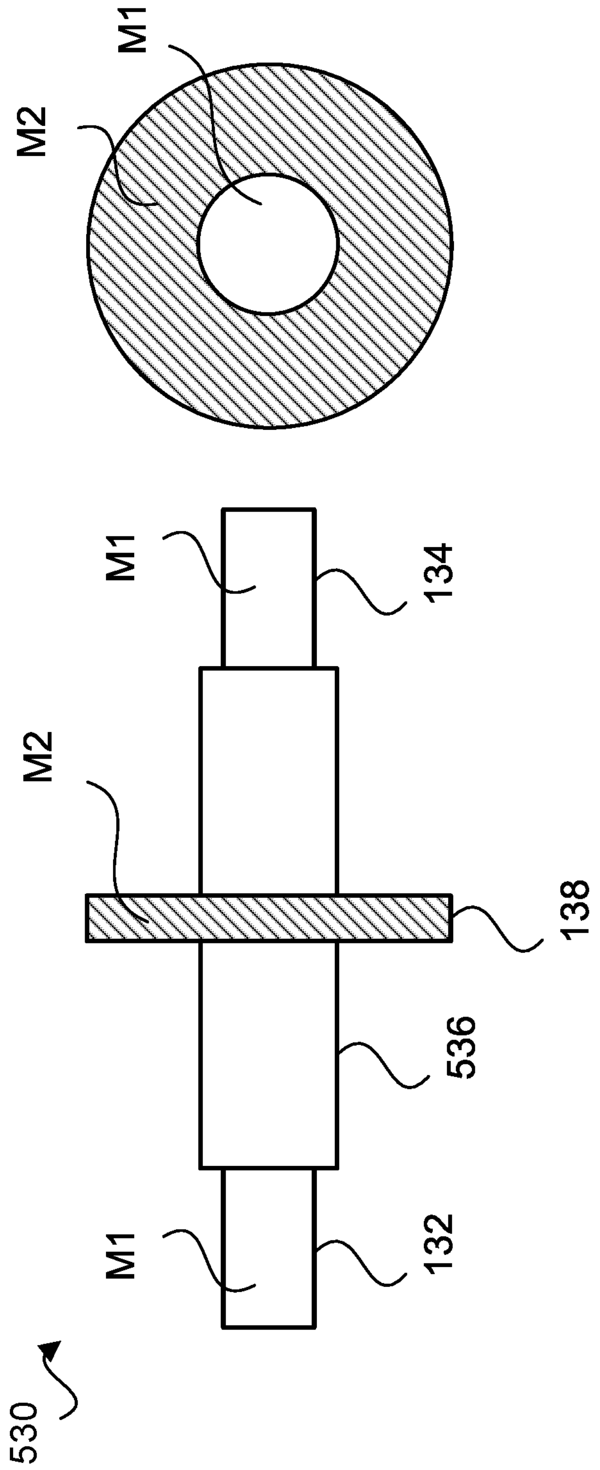
FIG. 5 illustrates a monolithic shaft for use in a cryogenic turbo machine according to a further preferred embodiment of the invention.

FIG. 5 illustrates a monolithic shaft 530 for use in a cryogenic turbo machine, e.g., cryogenic turbo machine 100 of FIG. 1, according to a further preferred embodiment of the invention. The left side of FIG. 5 shows a side view similar to FIGS. 3 and 4, and the right side of FIG. 5 shows a front view (along the axial direction of the monolithic shaft).

Similar to FIGS. 3 and 4, two impeller parts 132, 134 at the ends of monolithic shaft 430 are shown. Also, support part 138 is shown, said support part 138 being a disk shaped part. Said monolithic shaft 530 comprises a further support part 536. Said further support part 536 is used for supporting monolithic shaft by means of the radial magnetic bearings like bearings 142 of FIG. 1. This is similar as for part of the support part 136 of monolithic shaft 330, for example.

In this case, the further support part 536 and the impeller parts 132, 134 are parts of a common individual component. Like monolithic shaft 330, monolithic shaft 530 is made of two different materials, said first material M1 and said second material M2 (illustrated by means of shading). Said impeller parts 132, 134 and said further support part 536 comprise or are made of said first material M1, and said support part 138, which is a disk shaped part, comprises or is made of said second material M2. It is noted that in this example, support parts made of different materials are used.

Like for monolithic shaft 330, said first material M1 is, for example, precipitation hardening stainless steel (PHSS) which is quenched and double tempered or nickel based alloy (NBA). Such cryogenic steel achieves very good impact toughness properties. Said second material M2 is, for example, low alloy steel (LAS), whose main alloying elements are chromium, nickel and molybdenum. LAS has good impact properties, typically, at least down to −60° C. Such magnetic steel has very good ferromagnetic properties. Alternately, said second material M2 can be carbon steel (CS), which also has very good ferromagnetic properties.

Said monolithic shaft 530 is, preferably, made by additive manufacturing, e.g., wire arc additive manufacturing (WAAM), wire laser additive manufacturing (WLAM), direct energy deposition (DED), and cold spraying. The parts comprising or made of said first material, i.e., the impeller parts 132, 134 and the further support part 536, are provided as a common infidel component. Such individual component can kind of a pre-stage monolithic shaft, e.g., in cylinder shaped form. The part comprising or made of said second material, i.e., the disk shaped support part 138, is then added to that pre-stage monolithic shaft by means of additive manufacturing, e.g., layer by layer.

The interface in that case is located at the bottom of the disc in an area where the temperature is, typically, always positive (in ° C.). This allows a wider choice for the magnetic steel grade, with the possibility to use a carbon steel (CS) for said first material as well. However, this is technology is typically restricted to magnetic bearing machines without an electric machine.

Figure 6:
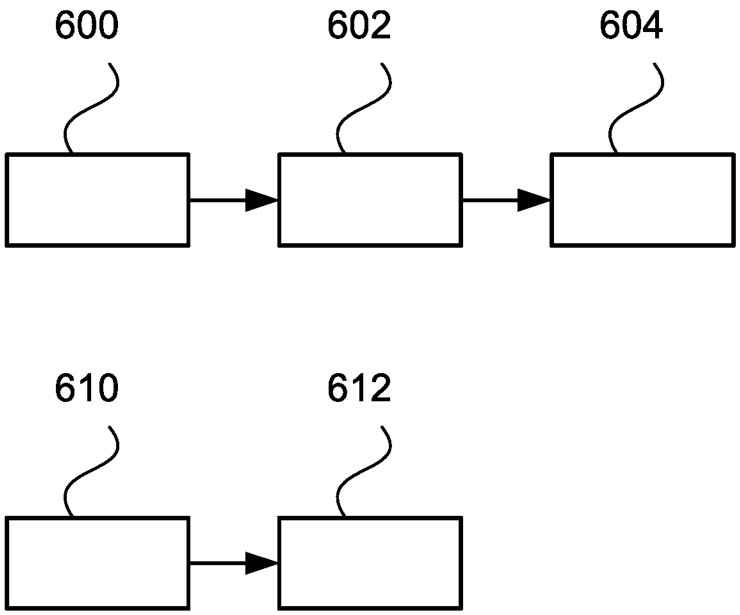
FIG. 6 illustrates manufacturing methods according to preferred embodiments of the invention.

FIG. 6 illustrates, by means of flow diagrams, manufacturing methods according to a preferred embodiments of the invention. The first method is rotative friction welding. In a first step 600, individual components comprising the monolithic shaft parts (like shown in FIGS. 3 and 4) are provided, all of which parts are made of said first material.

In a second step 602, a further individual component comprising the support part (like support part 136 shown in FIGS. 3 and 4) is provided. In a third step 604, these individual components are added together or combined by means of friction welding, i.e., the individual components are rotated with respect to each other, such that said materials at the interface melt. Afterwards, the interface area can be cleaned and/or brought into shape.

The second method is additive manufacturing. In a first step 610, an individual component comprising the monolithic shaft parts and the further support part (like shown in FIG. 5), is provided, all of which parts are made of said first material. In a second step 612, the support part (like support part 133 shown in FIG. 5) is added layer by layer. Note that this method also can be used for manufacturing the monolithic shafts shown in FIGS. 3 and 4.

The invention claimed is:

1. A cryogenic turbo machine comprising:

an impeller and a monolithic shaft, the monolithic shaft comprising an impeller part and a support part, and the impeller is mounted at the impeller part, wherein the monolithic shaft comprises a first material and a second material, wherein said first material and said second material differ from each other in ferromagnetic and/or cryogenic properties, wherein said impeller part comprises said first material, and said support part comprises said second material, wherein said first material and said second material are connected together by additive manufacturing, and wherein said first material comprises steel, a steel alloy, or a nickel-based alloy and wherein said second material comprises low alloy steel or a carbon steel, and the cryogenic turbo machine further comprising:

(a) magnetic bearings, by which the monolithic shaft is supported in an axial and/or radial direction, or (b) an electric machine, said electric machine comprising at least part of the monolithic shaft as at least part of a rotor.

2. The cryogenic turbo machine of claim 1, wherein said second material has a higher permeability and/or provides a higher magnetic induction than said first material, and/or wherein said first material has a higher impact toughness than said second material.

3. The cryogenic turbo machine of claim 1, wherein said first material comprises precipitation hardening stainless steel or a nickel-based alloy.

4. The cryogenic turbo machine of claim 1, wherein said impeller part is positioned at an end of the monolithic shaft, and the monolithic shaft comprises a further impeller part, at which a further impeller of the cryogenic turbo machine is to be mounted, wherein the further impeller part is positioned at another end of the monolithic shaft.

5. The cryogenic turbo machine of claim 1, wherein the support part comprises a disk-shaped part, and wherein the disk-shaped part is configured for use with an axial magnetic bearing.

6. The cryogenic turbo machine of claim 1, wherein said support part is configured for use as at least a part of a rotor of an electric machine.

7. The cryogenic turbo machine of claim 1, wherein the cryogenic turbo machine comprises magnetic bearings, by which the monolithic shaft is supported in an axial and/or radial direction.

8. The cryogenic turbo machine of claim 1, wherein the cryogenic turbo machine comprises an electric machine, said electric machine comprising at least part of the monolithic shaft as at least part of a rotor.

9. A method for manufacturing the cryogenic turbo machine of claim 1, comprising providing an individual component comprising one of the impeller part and the support part, and adding the other one of the impeller part and the support part to the component to form the monolithic shaft, wherein the adding of the other one of the impeller part and the support part to the component to form the monolithic shaft comprises combining the impeller part and the support part by additive manufacturing.

10. The method of claim 9, wherein the additive manufacturing is based on one of the following techniques: wire arc additive manufacturing, wire laser additive manufacturing, direct energy deposition, and cold spraying.

11. The cryogenic turbo machine of claim 3, wherein said precipitation hardening stainless steel is quenched and/or double tempered precipitation hardening stainless steel.

12. The cryogenic turbo machine of claim 1, wherein the cryogenic turbo machine comprises magnetic bearings, by which the monolithic shaft, at the support part, is supported in an axial and/or radial direction.

13. The cryogenic turbo machine of claim 1, wherein there is no discontinuity between the first material and the second material.

14. The cryogenic turbo machine of claim 7, wherein the magnetic bearings support the monolithic shaft in the axial and radial directions.

15. The cryogenic turbo machine of claim 12, wherein the magnetic bearings support the monolithic shaft, at the support part, in the axial and radial directions.

16. A cryogenic turbo machine comprising:

an impeller, a monolithic shaft comprising an impeller part, at which said impeller is mounted, and a support part, the monolithic shaft comprises a first material and a second material, wherein said first material and said second material differ from each other in ferromagnetic and/or cryogenic properties, wherein said impeller part comprises said first material, and said support part comprises said second material, and wherein said first material comprises steel, a steel alloy, or a nickel-based alloy and wherein said second material comprises low alloy steel or a carbon steel, said cryogenic turbo machine further comprising an electric machine, said electric machine comprising at least part of the monolithic shaft as at least part of a rotor.

17. A monolithic shaft configured for use in a cryogenic turbo machine with an impeller to be mounted at the monolithic shaft, the monolithic shaft comprising:

an impeller part, at which said impeller is to be mounted, and a support part, wherein the monolithic shaft comprises a first material and a second material, wherein said first material and said second material differ from each other in ferromagnetic and/or cryogenic properties, wherein said impeller part comprises said first material, and said support part comprises said second material, and wherein said first material comprises precipitation hardening stainless steel and said precipitation hardening stainless steel is quenched and/or double tempered precipitation hardening stainless steel, and wherein said second material comprises low alloy steel or a carbon steel.

* * * * *